UNITED STATES PATENT OFFICE 2,615,872

COPOLYMERS OF VINYLIDENE CYANIDE WITH HALOGENATED BUTADIENE-1,3 HYDROCARBONS

Seward J. Averill, Boston, Ohio, assignor to The B. F. Goodrich Company, New York, N. Y., a corporation of New York No Drawing. Application April 29, 1950, Serial No. 159,146

7 Claims. (Cl. 260—78.5)

This invention relates to the preparation of novel copolymers of vinylidene cyanide with a halogenated butadiene-1,3 hydrocarbon, which copolymers are extremely valuable synthetic resins, being especially useful in the preparation of filaments and films.

In U. S. Patent 2,476,270 to Alan E. Ardis, and in copending applications, Serial No. 63,434, filed December 3, 1948, now U. S. Patent 2,502,412, and Serial No. 79,712, filed March 4, 1949, now U. S. Patent 2,514,387, novel methods for the preparation of monomeric vinylidene cyanide are disclosed. In another copending application, Serial No. 11,336, filed February 26, 1948, methods for the preparation of useful copolymers of vinylidene cyanide are disclosed.

Monomeric vinylidene cyanide is a clear liquid at room temperature and a crystalline solid at 0° C. It melts in the range of 6.0° C. to 9.7° C., depending on purity, with purest samples melting at 9.0° C. to 9.7° C. and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When it is allowed to stand at room temperature in admixture with butadiene-1,3, it reacts therewith in the Diels-Alder reaction to give solid 4,4-dicyanocyclohexene.

It has now been discovered that when monomeric vinylidene cyanide of the above physical and chemical characteristics is copolymerized with a halogenated butadiene-1,3 hydrocarbon, either with or without the use of a free radical polymerization catalyst, new and highly useful, hard, horny, resinous copolymers are obtained. These copolymers are essentially 1:1 alternating copolymers, that is, copolymers possessing the structure:

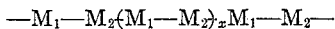

wherein each $M_1$ is a vinylidene cyanide unit

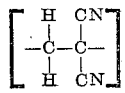

each $M_2$ is a unit of a halogenated butadiene-1,3 hydrocarbon, and $x$ is a polydigit number, preferably from 60 to 7,000. The fact that the copolymers thus obtained are essentially 1:1 alternating copolymers is determined by nitrogen and chlorine analysis of the copolymer and is substantiated by the following copolymerization equation of F. M. Lewis, C. Walling et al., Journal of American Chemical Society, 70, page 1,519, 1948:

$$\frac{d[M_1]}{d[M_2]} = \frac{[M_1]}{[M_2]} \cdot \frac{r_1[M_1]+[M_2]}{r_2[M_2]+[M_2]}$$

wherein $M_1$ = concentration of unreacted monomer $M_1$
$M_2$ = concentration of unreacted monomer $M_2$
$r_1$ = ratio of the rate constants for the reaction of an $M_1$ type radical with $M_1$ and $M_2$ respectively
$r_2$ = ratio of the rate constants for the reaction of an $M_2$ type radical with $M_2$ and $M_1$ respectively When the product of $r_1$ and $r_2$ (the values of $r_1$ and $r_2$ being determined by solving the above equation for $r_1$ and $r_2$) is equivalent to 0, a 1:1 alternating copolymer is formed, that is a copolymer having the

structure shown hereinabove for the copolymers of vinylidene cyanide with 2-halo-butadienes. That these copolymers possess the 1:1 alternating structure is shown by the fact that when $M_1$ is vinylidene cyanide and $M_2$ is 2-chloro-butadiene-1,3, $r_1=0.0017$ and $r_2=0.0102$; therefore, the product of $r_1$ and $r_2$ is 0.000017, which is, of course, substantially zero.

It is surprising that vinylidene cyanide and halogenated butadiene-1,3 hydrocarbons will copolymerize at all, for it has been found that conjugated diolefins exhibit a strong tendency to form a Diels-Alder adduct with vinylidene cyanide. However, when the copolymerization is carried out according to the method of this invention, adduct formation, if any, is for all practical purposes negligible.

Because of the fact that it is readily obtainable in commercial quantities and at relatively low cost, 2-chloro-butadiene-1,3 is the preferred halogenated butadiene-1,3 hydrocarbon for use in forming copolymers with vinylidene cyanide. However, the other 2-halo-butadienes including 2-bromo-butadiene-1,3, 2-iodo-butadiene-1,3, 2-chloro-3-methyl-butadiene-1,3, 2-bromo-3-methyl-butadiene-1,3, 1-bromo-2-methyl-butadiene-1,3, 2-iodo-3-methyl-butadiene-1,3, 1-fluoro-2-methyl-butadiene-1,3 and the like also polymerize with vinylidene cyanide to give excellent copolymers.

The polymerization itself may be carried out in several ways. One preferred method consists in first dissolving the vinylidene cyanide and the halogenated butadiene-1,3 hydrocarbon in benzene or other aromatic solvents such as toluene, methyl toluene, trichloro benzene, or the like preferably in an amount such that the solvent comprises less than 90% by weight of the total solution. Other solvents which are useful are the halogenated aliphatic hydrocarbons such as dichlorethane, trichloroethane, chlorobutane and the like. This solution is then maintained at a temperature of about −15° C. to 100° C. and preferably at 30° C. to 80° C., whereupon polymerization occurs to form the desired copolymer as a white powder of small particle size. When the polymerization is carried out in this manner no catalyst is necessary although one may be used if desired. When more than 90 weight per cent of the solvent is utilized a catalyst is necessary since if no catalyst is used under such conditions a Diels-Alder adduct will be formed in large quantities and only a very small portion of copolymer will be obtained. The copolymer thus formed may be separated from the polymerization medium simply by filtering, or if desired the polymerization medium may be removed by an evaporation process. It is important that the polymerization medium be free from materials which initiate the ionic polymerization of the vinylidene cyanide, for example water and other sources of hydroxyl ion, since the presence of such materials does not favor the formation of the desired alternating copolymer but rather results in the formation of quantities of poor quality polyvinylidene cyanide. For these reasons the polymerization process of this invention cannot be carried out in an emulsion system.

Alternatively, the polymerization may be carried out without the use of a solvent or other liquid medium for the monomers, that is simply by heating and agitating a mixture of the monomers, with or without the use of a polymerization catalyst. However, polymerization by this method is not especially preferred since the polymerization tends to proceed so rapidly that the resulting copolymer is slightly charred although the copolymer is of the essentially 1:1 alternating type. Also, the polymerization may be effected at temperatures as low as −15° C. or lower or as high as 100° C. or even higher regardless of whether or not a catalyst is utilized. Also, if desired, fresh quantities of one or both of the monomers, and also of catalyst or solvent, may be added either continuously or intermittently, to the polymerization mixture during the course of the polymerization, thus taking fullest advantage of the capacity of the equipment and in effect operating a continuous or semi-continuous process.

The catalysts which are suitable for use in the polymerization include the peroxygen compounds such as silver peroxide, the perborates, the percarbonates, benzoyl peroxide, caproyl peroxide, lauroyl peroxide, acetone peroxide, acetyl benzoyl peroxide, cumene hydroperoxide, ortho, ortho'-dibromobenzoyl peroxide, ortho, ortho'-dichlorobenzoyl peroxide, caprylyl peroxide, pelargonyl peroxide, tertiary butyl hydroperoxide, tetralin peroxide and the like. In general from 0.1 to 5% by weight of the catalyst is utilized although smaller or larger amounts may be utilized if desired.

The following examples illustrate the preparation of copolymers of vinylidene cyanide with halogenated butadiene-1,3 hydrocarbons in accordance with this invention, but are not to be construed as a limitation upon the scope thereof, for there are of course numerous possible variations and modifications. In the examples all parts are by weight.

EXAMPLES I TO VIII

A series of seven copolymers are prepared by dissolving vinylidene cyanide and 2-chloro-butadiene-1,3 in benzene, and adding ortho, ortho'-dichlorobenzoyl peroxide as the polymerization catalyst. The temperature of the resulting mixture is maintained at about 40° C., whereupon polymerization occurs to form the essentially 1:1 alternating copolymer. The copolymer, a hard resinous, non-rubbery solid, is separated from the polymerization medium by filtering. The charging ratios, conversions obtained, analysis of the copolymer and other pertinent data are shown in Table I below.

*Table I*

| Example | I | II | III | IV | V | VI | VII | VIII |
|---|---|---|---|---|---|---|---|---|
| Parts Benzene | 17.6 | 17.6 | 17.6 | 17.6 | 17.6 | 17.6 | 4.15 | 20.75 |
| Weight Percent Benzene | 90.0 | 90.0 | 90.0 | 90.0 | 90.0 | 90.0 | 50.0 | 83.0 |
| Parts Vinylidene Cyanide | 1.31 | 1.31 | 0.91 | 0.91 | 0.53 | 0.17 | 1.95 | 1.95 |
| Mole Percent Vinylidene Cyanide | 70.0 | 70.0 | 50.0 | 50.0 | 30.0 | 10.0 | 50.0 | 50.0 |
| Parts 2-Chloro-Butadiene-1,3 | 0.64 | 0.64 | 1.04 | 1.04 | 1.42 | 1.78 | 2.2 | 2.2 |
| Mole Percent 2-Chloro-Butadiene-1,3 | 30.0 | 30.0 | 50.0 | 50.0 | 70.0 | 90.0 | 50.0 | 50.0 |
| Parts Catalyst [1] | 0.0098 | 0.0098 | 0.0098 | 0.0098 | 0.0098 | 0.0098 | 0.0 | 0.0 |
| Weight Percent Catalyst (Based on Total Monomer Weight) | 0.5 | 0.5 | 0.5 | 0.5 | 0.5 | 0.5 | | |
| Polymerization Time (Hours) | 18.5 | 18.5 | 18.5 | 18.5 | 3.0 | 3.0 | 1.0 | 3.0 |
| Percent Conversion | 32.0 | 24.0 | 37.0 | 59.0 | 18.0 | 27.0 | 70.0 | 34.0 |
| Weight Percent Nitrogen in Copolymer | 16.89 | 16.85 | 16.42 | 16.48 | 16.06 | 16.02 | 16.35 | 16.75 |
| Mole Percent Vinylidene Cyanide in Copolymer | 50.0 | 49.9 | 48.9 | 49.0 | 47.7 | 47.7 | 48.4 | 49.5 |

[1] Ortho, ortho'-dichlorobenzoyl peroxide.

The examples clearly show that the two monomers enter the polymer chain in essentially equimolar ratios regardless of the degree of monomer to polymer conversion and of charging ratio.

When other of the halogenated butadiene-1,3 hydrocarbons selected from those disclosed hereinabove are substituted for 2-chloro-butadiene-1,3 in the above examples, the copolymers obtained possess properties generally equivalent to the vinylidene cyanide-chloroprene copolymers. Likewise, when the polymerization is carried out according to other conventional methods, using other of the peroxygen catalysts disclosed hereinabove or utilizing no catalyst at all, excellent results are achieved.

The copolymers which are prepared according to this invention are characterized by being hard, resinous, non-rubbery materials which are insoluble in benzene, toluene, ethers and alcohols. Furthermore, the copolymers thus prepared are relatively stable at ordinary temperatures but melt at temperatures of about 240° C. with no decomposition. These desirable properties render the copolymers of this invention extremely valuable in the melt spinning of synthetic filaments of any desired size and possessing unusually high tensile strength, low elongation, excellent resistance to the action of alkalis and acids, as well as many other advantageous properties. The physical properties of the filaments thus prepared are excellent and can be even further enhanced by a cold drawing process. In addition to being especially useful in the preparation of filaments the copolymers of this invention are also useful in the preparation of molded objects and may be cast into excellent films.

Although specific examples of the invention have been herein described, it is not intended to limit the invention solely thereto, but to include all the variations and modifications falling within the spirit and scope of the appended claims.

I claim:

1. A hard, resinous, non-rubbery copolymer of vinylidene cyanide and a halogenated butadiene-1,3 hydrocarbon, said copolymer possessing essentially the structure

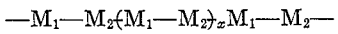

wherein each $M_1$ is a vinylidene cyanide unit of the structure

each $M_2$ is a unit of said halogenated butadiene-1,3 hydrocarbon and $x$ is a polydigit number, the vinylidene cyanide units in said copolymer being derived from monomeric vinylidene cyanide which is a liquid at room temperature and a crystalline solid at 0° C., having a melting point when in purest form of substantially 9.0° C. to 9.7° C., and being characterizable chemically by the ability to undergo on contact with water at room temperature an instantaneous homopolymerization reaction to give a solid, water-insoluble resin.

2. A copolymer of claim 1 wherein the halogenated butadiene-1,3 hydrocarbon is 2-chlorobutadiene-1,3.

3. The method which comprises admixing monomeric vinylidene cyanide and a monomeric halogenated butadiene-1,3 hydrocarbon to form a single phase mixture, the monomeric vinylidene cyanide present in said single phase mixture being a liquid at room temperature and a crystalline solid at 0° C. having a melting point when in purest form of substantially 9.0° C. to 9.7° C. and being characterizable chemically by the ability to undergo on contact with water at room temperature an instantaneous homopolymerization reaction to give a solid, water-insoluble resin adding a peroxygen catalyst, and maintaining said single phase mixture at a temperature of 30° C. to 80° C. for a time sufficient to effect copolymerization of the said vinylidene cyanide and said halogenated butadiene-1,3 hydrocarbon and formation of a hard, resinous, non-rubbery copolymer of said vinylidene cyanide and the halogenated butadiene-1,3 hydrocarbon, said copolymer possessing essentially the structure

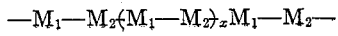

wherein each $M_1$ is a vinylidene cyanide unit of the structure

each $M_2$ is a unit of said halogenated butadiene-1,3 hydrocarbon, and $x$ is a polydigit number.

4. The method of claim 3 wherein the peroxygen catalyst is o,o'-dichlorobenzoyl peroxide.

5. The method which comprises preparing a solution containing monomeric vinylidene cyanide, a monomeric halogenated butadiene-1,3 hydrocarbon and a solvent for the monomeric vinylidene cyanide and the halogenated butadiene-1,3 hydrocarbon, said solvent comprising less than 90% by weight of the total solution, the monomeric vinylidene cyanide present in said solution being a liquid at room temperature and a crystalline solid at 0° C., having a melting point when in purest form of substantially 9.0° C. to 9.7° C., and being characterizable chemically by the ability to undergo on contact with water at room temperature an instantaneous homopolymerization reaction to give a solid, water-insoluble resin, maintaining the said solution at a temperature of 30° C. to 80° C. for a time sufficient to effect copolymerization of the said vinylidene cyanide and said halogenated butadiene-1,3 hydrocarbon and precipitation of a hard, resinous, non-rubbery copolymer of vinylidene cyanide and the halogenated butadiene-1,3 hydrocarbon from the said solution, said copolymer possessing essentially the structure

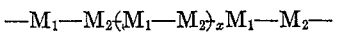

wherein each $M_1$ is a vinylidene cyanide unit of the structure

each $M_2$ is a unit of said halogenated butadiene-1,3 hydrocarbon and $x$ is a polydigit number.

6. The method of claim 5 wherein the solvent is selected from the class consisting of aromatic hydrocarbons and halogenated aromatic hydrocarbons.

7. The method of claim 5 wherein the halogenated butadiene-1,3 hydrocarbon is 2-chlorobutadiene-1,3 and the solvent is benzene.

SEWARD J. AVERILL.

REFERENCES CITED

The following references are of record in the file of this patent:

UNITED STATES PATENTS

| Number | Name | Date |
|---|---|---|
| 2,466,395 | Dickey | Apr. 5, 1949 |